(12) United States Patent
Takeda

(10) Patent No.: US 12,005,623 B2
(45) Date of Patent: Jun. 11, 2024

(54) RUBBER MATERIAL SUPPLYING METHOD AND RUBBER MATERIAL SUPPLYING DEVICE

(71) Applicant: Nakata Engineering Co., Ltd., Hyogo (JP)

(72) Inventor: Noriyuki Takeda, Kobe (JP)

(73) Assignee: Nakata Engineering Co., Ltd., Kobe (JP)

( * ) Notice: Subject to any disclaimer, the term of this patent is extended or adjusted under 35 U.S.C. 154(b) by 698 days.

(21) Appl. No.: 17/272,579

(22) PCT Filed: Apr. 4, 2019

(86) PCT No.: PCT/JP2019/014951
§ 371 (c)(1),
(2) Date: Mar. 1, 2021

(87) PCT Pub. No.: WO2020/049788
PCT Pub. Date: Mar. 12, 2020

(65) Prior Publication Data
US 2021/0323212 A1 Oct. 21, 2021

(30) Foreign Application Priority Data
Sep. 7, 2018 (JP) .................................. 2018-167645

(51) Int. Cl.
*B29C 48/285* (2019.01)
*B29B 7/58* (2006.01)
(Continued)

(52) U.S. Cl.
CPC ...... *B29C 48/2888* (2019.02); *B29C 48/0019* (2019.02); *B29C 48/0022* (2019.02);
(Continued)

(58) Field of Classification Search
CPC ............ B29C 48/2888; B29C 48/0019; B29C 48/0022; B29C 48/07; B29C 48/397;
(Continued)

(56) References Cited

U.S. PATENT DOCUMENTS 3,396,429 A * 8/1968 Geyer ................. B29C 48/2888
425/291
3,503,289 A 3/1970 Friberg
(Continued)

FOREIGN PATENT DOCUMENTS

DE 2250542 A1 4/1974
JP S48-043782 A 6/1973
(Continued)

OTHER PUBLICATIONS

International Search Report issued in PCT/JP2019/014951; mailed Jul. 9, 2019.

*Primary Examiner* — Galen H Hauth
*Assistant Examiner* — Baileigh Kate Darnell
(74) *Attorney, Agent, or Firm* — Studebaker & Brackett PC

(57) ABSTRACT

Provided are a rubber material supplying method and a rubber material supplying device, whereby a rubber material can be smoothly supplied to a rubber inlet even when the width of the rubber material is greater than the width of the rubber inlet. The rubber material supplying method includes a separation step S1, a processing step S2, and an input step S3. In the separation step S1, a plurality of different cutouts 30 are formed in a leading end section GF of a rubber material G, and the leading end section GF is separated into three or more strip shape sections 31. In the processing step S2, second strip shape sections B, and not first strip shape sections 31A, among the plurality of strip sections 31 are each cut out or folded. In the input step S3, the leading end
(Continued)

section GF is input to the rubber inlet 3A from the first strip shape sections 31A.

11 Claims, 9 Drawing Sheets

(51) Int. Cl.
| | | |
|---|---|---|
| *B29B 7/60* | (2006.01) | |
| *B29B 7/74* | (2006.01) | |
| *B29C 48/00* | (2019.01) | |
| *B29C 48/07* | (2019.01) | |
| *B29C 48/395* | (2019.01) | |
| *B29K 21/00* | (2006.01) | |

(52) U.S. Cl.
CPC ............ *B29C 48/07* (2019.02); *B29C 48/397* (2019.02); *B29K 2021/00* (2013.01)

(58) Field of Classification Search
CPC ....... B29C 48/285; B29C 31/04; B29C 31/08; B29C 2793/00; B29C 2793/0027; B29C 2793/36; B29C 2793/0054; B29C 2793/0063; B29C 2793/0072; B29C 2793/0081; B29C 48/588; B29B 7/42; B29B 7/7495; B29B 7/60; B29B 7/588; B29K 2021/00

See application file for complete search history.

(56) References Cited

U.S. PATENT DOCUMENTS

| | | | |
|---|---|---|---|
| 3,712,773 A * | 1/1973 | Baumgarten | ....... B29C 48/2888 83/61 |
| 3,738,580 A | 6/1973 | Harris | |
| 7,708,547 B2 | 5/2010 | Nicolas et al. | |
| 2008/0197527 A1* | 8/2008 | Nicolas | ................. B29C 48/395 264/138 |
| 2018/0044118 A1* | 2/2018 | Preick | .................. B29C 48/395 |
| 2019/0111578 A1* | 4/2019 | Mulder | .................. B26D 7/015 |
| 2021/0268459 A1* | 9/2021 | Pielsticker | .......... B01F 35/7177 |

FOREIGN PATENT DOCUMENTS

| | | |
|---|---|---|
| JP | S58-211435 A | 12/1983 |
| JP | H01-146709 A | 6/1989 |
| JP | H01-228805 A | 9/1989 |
| WO | 2012/164424 A2 | 12/2012 |

* cited by examiner

RUBBER MATERIAL SUPPLYING METHOD AND RUBBER MATERIAL SUPPLYING DEVICE

TECHNICAL FIELD

The present invention relates to a rubber material supply method for supplying a strip-shaped unvulcanized rubber material to a rubber inlet from a leading end portion in a length direction, and a rubber extruding device.

BACKGROUND ART

Conventionally, a rubber extruder that continuously extrudes rubber in a predetermined cross-sectional shape has been known. The rubber inlet of this type of rubber extruder is supplied with a strip-shaped unvulcanized rubber material from a rubber material supplying device. The strip-shaped rubber material has a predetermined width. However, depending on the rubber extruder, the opening width of the rubber inlet may be smaller than a width of the rubber material, and there has been a problem that the rubber material cannot be supplied into the rubber extruder.

Hence, the following Patent Document 1 has proposed a rubber material folding device for reducing the maximum width of a strip-shaped rubber material. This device includes first rotary blades, second rotary blades, and a shooter. The first rotary blades divide the entire rubber material into three equal parts in the width direction. The second rotary blades make depressions along the longitudinal direction of the respective rubber materials divided into three equal parts. The shooter guides each of the rubber materials divided into three equal parts to the rubber inlet while folding them in a box shape along the depressions.

CITATION LIST

Patent Literature

Japanese Unexamined Patent Application Publication S48-043782

SUMMARY OF INVENTION

Technical Problem

Unfortunately, in the rubber material folding device proposed above, a leading edge of the rubber material strongly comes into contact with a wall surface of the shooter. Thus, there has been a problem that the rubber material floats up and the rubber material cannot be supplied to the rubber inlet smoothly.

The present invention has a main object to provide a rubber material supplying method and a rubber material supplying device which are capable of supplying smoothly the rubber material to a rubber inlet even when the width of the rubber material is larger than the width of the rubber inlet.

Solution to Problem

The first invention relates to a rubber material supply method for supplying a strip-shaped unvulcanized rubber material to a rubber inlet from a leading end portion in a length direction of the rubber material, the method including:

a separation step of making a plurality of cuts extending rearwardly in the length direction from a leading edge of the leading end portion of the rubber material to be conveyed in the length direction, the plurality of cuts being different in length L with each other to separate the leading end portion into three or more separated strip-shaped portions that include a first strip-shaped portion adjacent to one of the cuts having a minimum length and second strip-shaped portions other than the first strip-shaped portion;

a processing step of cutting off or folding up the second strip-shaped portions; and an input step of inputting the leading end portion, in which the second strip-shaped portions have cut off or folded up, into the rubber inlet from the first strip-shaped portion;

wherein a width of the first strip-shaped portion is smaller than an opening width of the rubber inlet.

In the rubber material supply method according to the present invention, in the processing step, the second strip-shaped portions may be folded up so as to overlay on a following portion of the rubber material based on positions of rear ends of cuts adjacent to the second strip-shaped portions.

In the rubber material supply method according to the present invention, in the processing step, the second strip-shaped portions may be cut off based on positions of rear ends of cuts adjacent to the second strip-shaped portions.

In the rubber material supply method according to the present invention, the rubber inlet is a rubber inlet of a rubber extruder that comprises a barrel and a screw shaft being held rotatably in the barrel, and the minimum length Lmin of the cuts is preferably 1.0 times or more a distance Lf from an upper end of the rubber inlet to an outer circumference of the screw shaft.

In the rubber material supply method according to the present invention, in a pair of cuts that is adjacent to the first strip-shaped portion, one of the cuts preferably has a length equal to or more than 1.6 times a length of the other one of the cuts.

The second invention relates to a rubber material supply device for carrying out the rubber material supplying method according to the first invention, the device including:

a carrier that conveys the rubber material from the leading end to a downstream side;

a cutting tool that makes the plurality of cuts extending rearwardly in the length direction from the leading edge of the leading end portion of the rubber material in the length direction, the plurality of cuts being different in length L with each other to separate the leading end portion into three or more separated strip-shaped portions that include the first strip-shaped portion adjacent to one of the cuts having the minimum length and the second strip-shaped portions other than the first strip-shaped portion; and a processing tool to cut off or fold up the second strip-shaped portions, wherein the width of the first strip-shaped portion is smaller than the opening width of the rubber inlet, and the device is configured to input the leading end portion, in which the second strip-shaped portions have cut off or folded up, into the rubber inlet from the first strip-shaped portion.

In the rubber material supply device according to the present invention, the cutting tool preferably comprises a plurality of cutters for making the plurality of cuts.

In the rubber material supply device according to the present invention, the processing tool is preferably a folding tool that folds the second strip-shaped portion so as to overlay on a following portion of the rubber material based on positions of rear ends of cuts adjacent to the second strip-shaped portions.

In the rubber material supply device according to the present invention, the folding tool preferably crimps the folded second strip-shaped portion onto the following portion.

In the rubber material supply device according to the present invention, the folding tool preferably comprises a conveyor portion arranged on the downstream side of the carrier, and a crimping roller arranged above the conveyor portion to fold the second strip-shaped portion with the conveyor portion and to crimp it onto the following portion.

Advantageous Effects of Invention

The rubber material supplying method according to the first invention includes the separation step, the processing step and the input step. Then, in the separation step, a plurality of cuts having different lengths L are formed in the leading end portion of the rubber material, thereby separating the leading end portion into three or more strip-shaped portions.

Further, in the processing step, the second strip-shaped portions other than the first strip-shaped portion that is adjacent to the cut having the minimum length among the plurality of strip-shaped portions is cut off or folded up. At this time, since the lengths L of the cuts are different from each other, the cutting positions or the folding positions of the second band-shaped portions are located in different positions with one another from the leading edge of the rubber material. That is, the width of the leading end portion changes stepwise from the leading edge side. Moreover, at least the width of the first band-shaped portion is set to be smaller than the opening width of the rubber inlet.

Thus, by inputting the leading end portion, in which the second strip-shaped portions have cut off or folded up, into the rubber inlet from the first strip-shaped portion, it can weaken the rubber material from catching on the shooter wall so that the rubber material can be supplied smoothly.

Since the rubber material supplying device according to the second invention can carry out the rubber material supplying method according to the first invention, the same effect can be obtained.

DESCRIPTION OF EMBODIMENTS

Hereinafter, a rubber material supply method according to the first invention will be described with reference to the drawings together with a rubber material supply device 1 for carrying out the method.

The rubber material supply method according to the first invention includes a separation step S1 (shown in FIG. 4), a processing step S2 (shown in FIG. 5), and an input step S3 (shown in FIG. 6).

Figure 1:
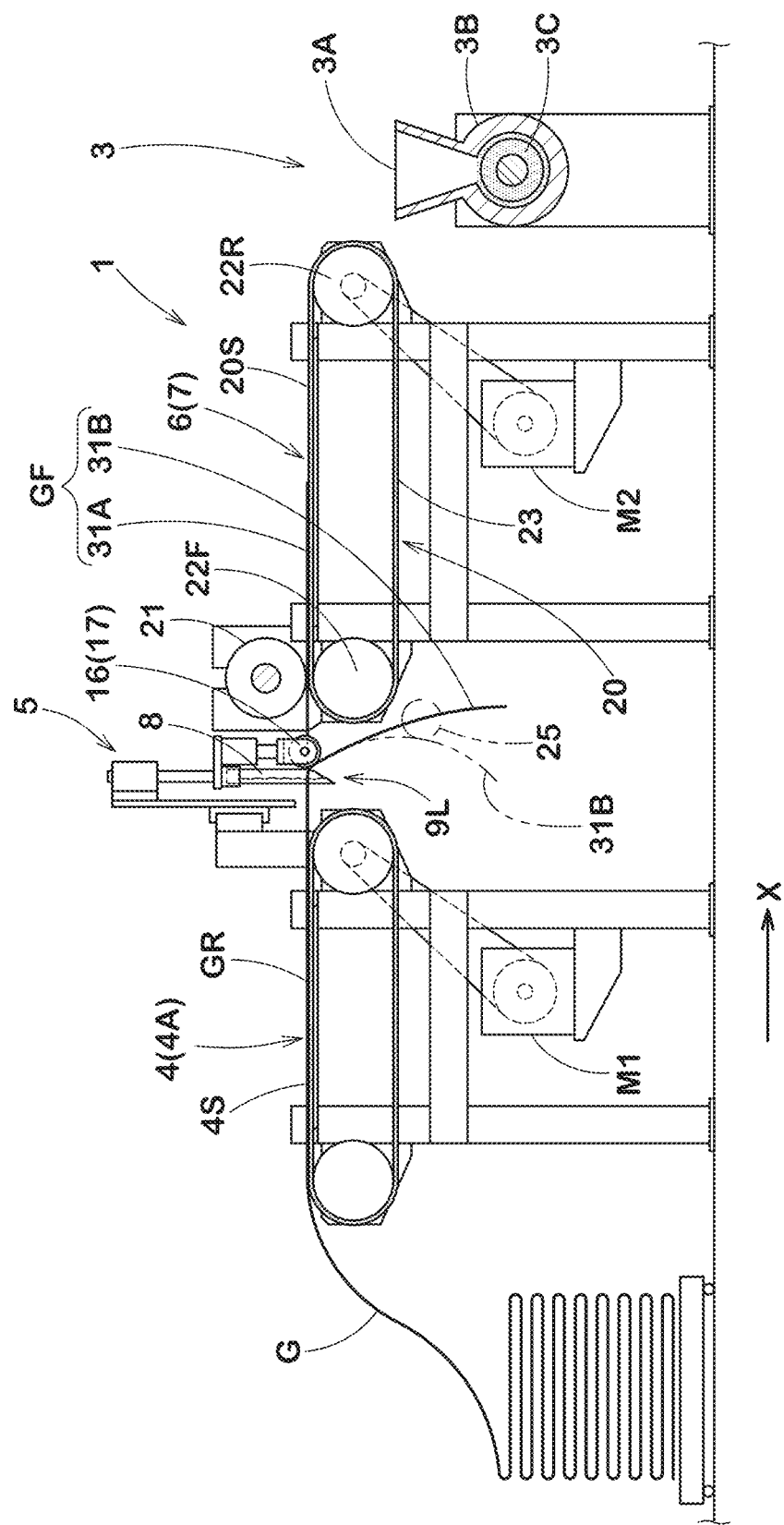
FIG. 1 is a side view of an embodiment of a rubber material supplying device for carrying out the rubber material supplying method according to the first invention.
Figure 2:
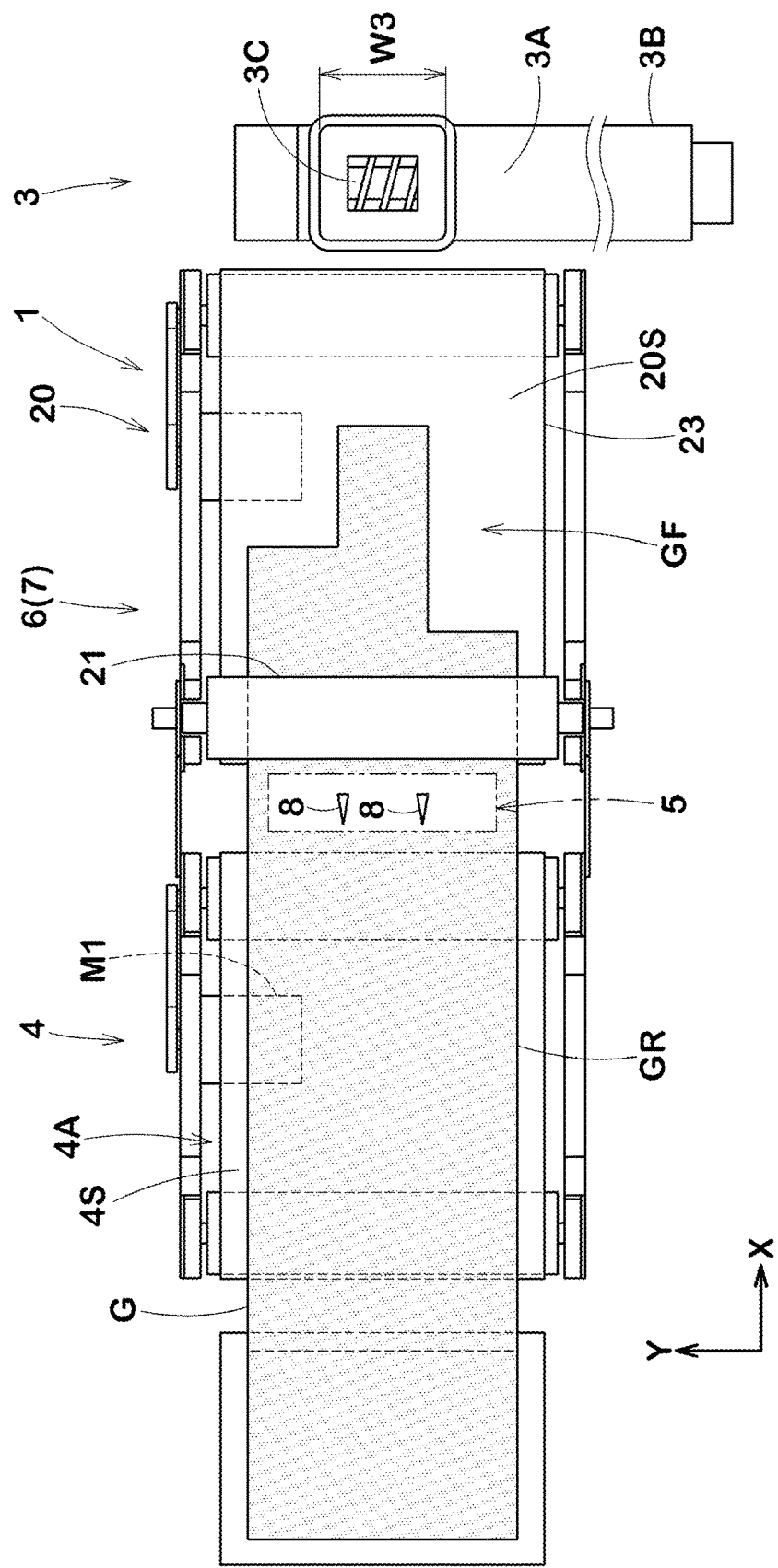
FIG. 2 is a plan view of the rubber material supplying device.
Figure 3:
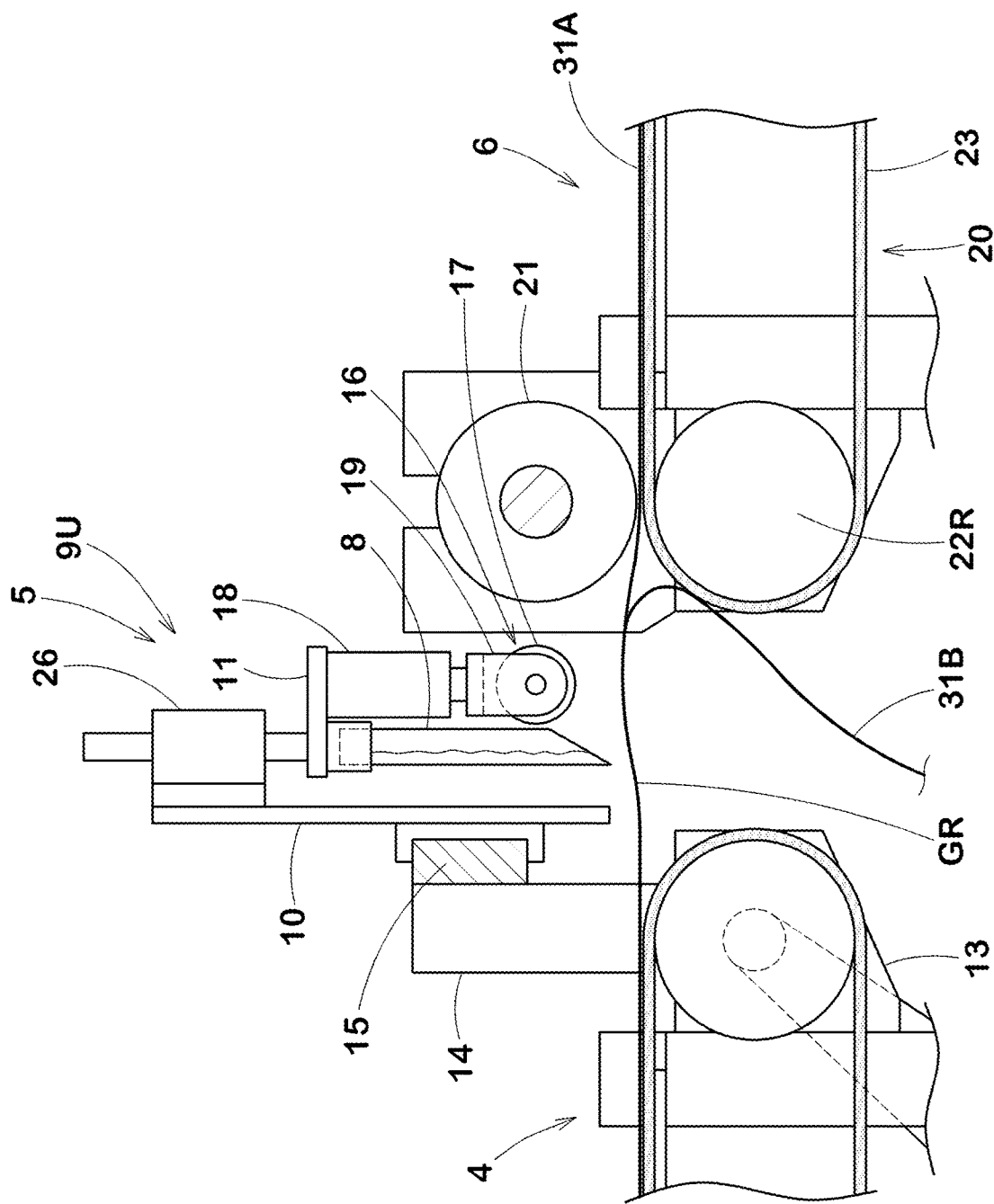
FIG. 3 is a side view showing a cutting tool and a processing tool.

In addition, FIG. 1 is a side view of an embodiment of the rubber material supplying device 1 for carrying out the rubber material supplying method according to the first invention, FIG. 2 is a plan view thereof, and FIG. 3 is a side view showing a cutting tool 5 and a processing tool 6 of the rubber material supplying device 1.

As illustrated in FIGS. 1 and 2, the rubber material supplying device 1 according to the present embodiment is used to supply a strip-shaped unvulcanized rubber material G to a rubber inlet 3A of a rubber extruder 3 from a leading end portion GF in the length direction X.

The rubber extruder 3 includes the rubber inlet 3A, a cylindrical barrel 3B, and a screw shaft 3C being held rotatably in the barrel 3b. The rubber inlet 3A has an open top and is provided on the rear end side in a rubber extruding direction of the barrel 3B. Such a rubber extruder 3 can continuously extrude in a predetermined cross-sectional shape while kneading the rubber material G supplied from the rubber inlet 3A. As the rubber extruder 3, various conventional structures can be employed.

Next, the rubber material supplying device 1 includes a carrier 4, the cutting tool 5, and the processing tool 6, and supplies the rubber material G to the rubber inlet 3A of the rubber extruder 3 that is placed on the downstream side.

The carrier 4, for example, includes a conveyor portion 4A such as a belt conveyor and the like, and transports the rubber material G downstream from the leading end portion GF on a conveyor surface 4S. The conveyor surface 4S is driven by a motor M1. As the conveyor portion 4A, a motor-driven roller conveyor can also be used.

The cutting tool 5 carries out the separation step S1 in the rubber material supplying method.

Figure 4A:
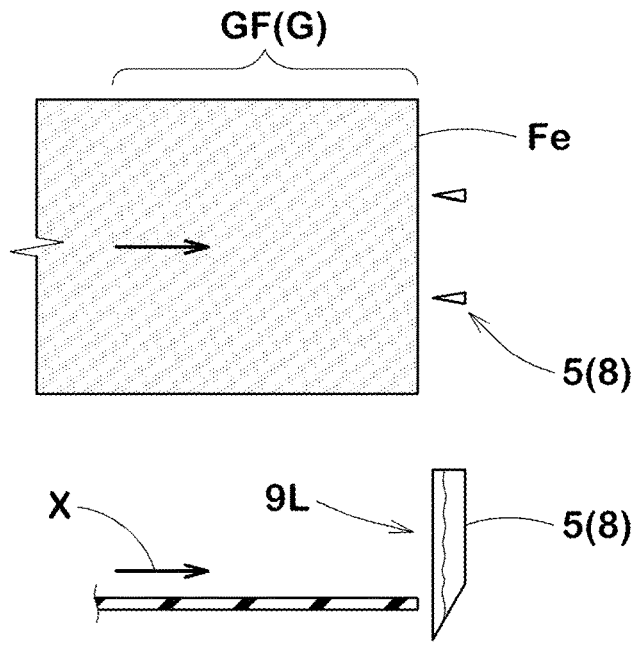
FIGS. 4A and 4B are conceptual views showing a separation step.
Figure 4B:
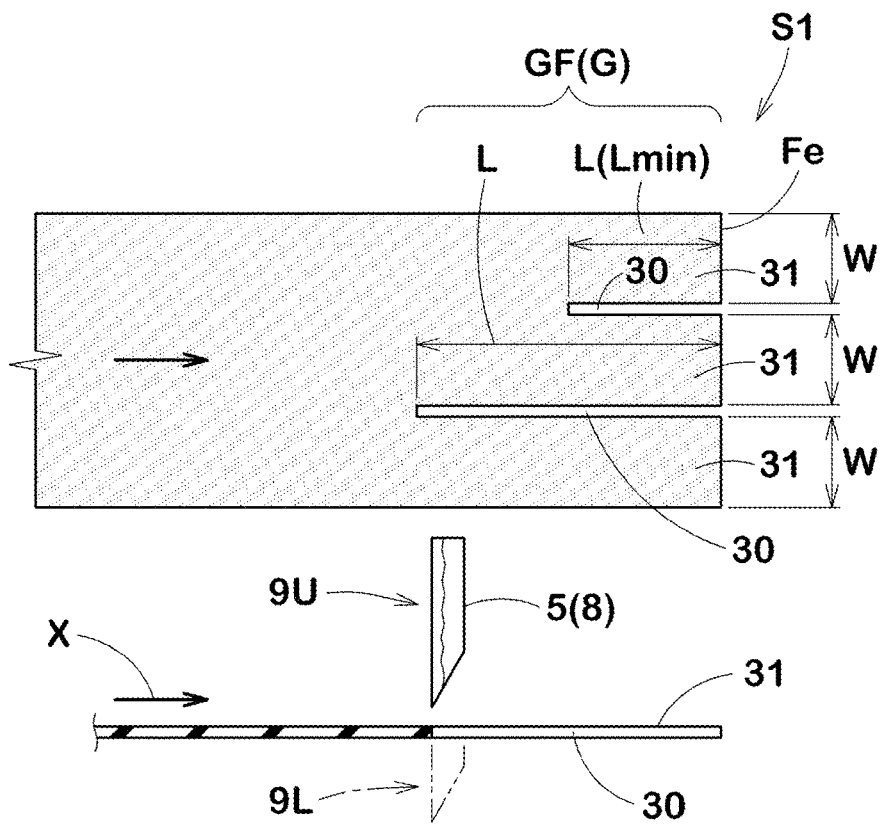

As illustrated in FIGS. 4A and 4B, in the separation step S1, a plurality (n) of cuts 30 extending rearwardly in the length direction X from the leading edge Fe of the leading end portion GF of the rubber material G to be conveyed in the length direction X is formed using the cutting tool 5. With this, the leading end portion GF is separated into a plurality (n+1) of separated strip-shaped portions 31. In this example, the case of n=2 is shown. Of the plurality (n+1) strip-shaped portions 31, a width W of at least one strip 31 is set to be smaller than an opening width W3 (shown in FIG. 2) of the rubber inlet 3A.

Figure 9A:
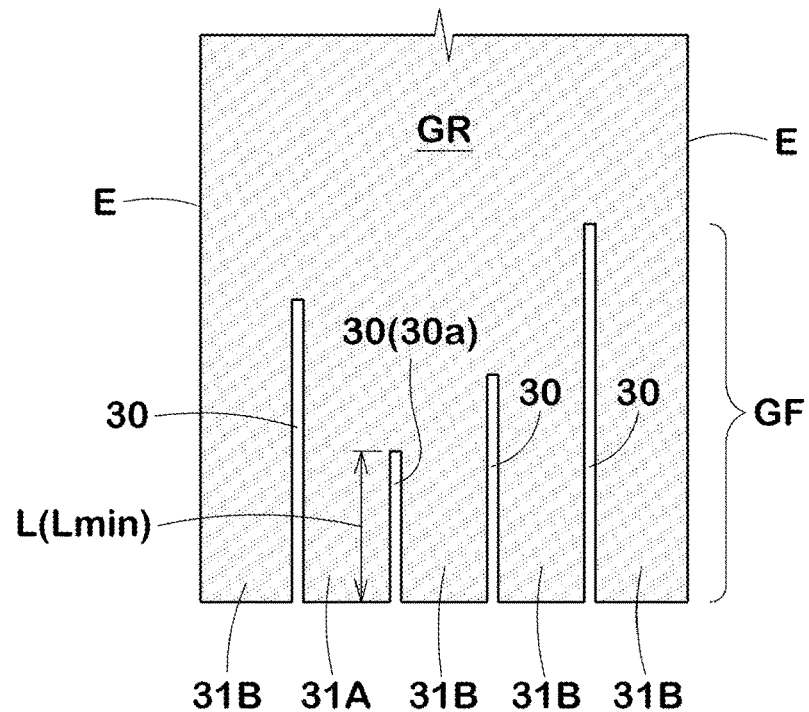
FIGS. 9A to 9B are conceptual views showing the separation step and the processing step with three or more cuts.

The plurality (n) of cuts 30 differs from each other in length L from the leading edge Fe. As illustrated in FIG. 9A, when the cuts 30 are three or more (n>=3), the n cuts 30 are arranged so that the length L becomes longer from the minimum length cut 30a at which the length L is the minimum Lmin toward both side edges E of the rubber material G.

As illustrated in FIG. 2, the cutting tool 5, in this example, includes n knife-shaped cutters 8 for forming n cuts 30 provided near the leading edge of the carrier 4. As illustrated in FIGS. 4A and 4B, as the rubber material G moves forward with respect to the cutters 8, the leading end portion GF is cut in the longitudinal direction X from its leading edge Fe. In addition, each cutter 8 rises from a lowering position 9L for cutting to a rising position 9U for standby at a predetermined timing, so that each cut 30 is formed with a predetermined length L.

As illustrated in FIG. 3, the cutting tool 5 according to the present embodiment includes n laterally moving bodies 10 supported by the carrier 4 and elevating bodies 11 supported by the respective laterally moving bodies 10 so as to be vertically movable. The cutters 8 are held in the elevating bodies 11.

In this embodiment, the carrier 4 is provided with, for example, a pair of columns 14 rising from a frame 13 of the carrier 4 and a guide rail 15 extending between the columns 14 in the width direction Y. Then, the laterally moving bodies 10 can be guided by the guide rail 15 and move in the width direction Y. Thus, the width W of each strip-shaped portion 31 can be adjusted or changed.

Further, for example, a cylinder 26 is attached to each laterally moving body 10, and each elevating body 11 is supported at a lower end of the rod of each cylinder 26.

Next, the processing tool 6 carries out the processing step S2 in the rubber material supply method.

Figure 5A:
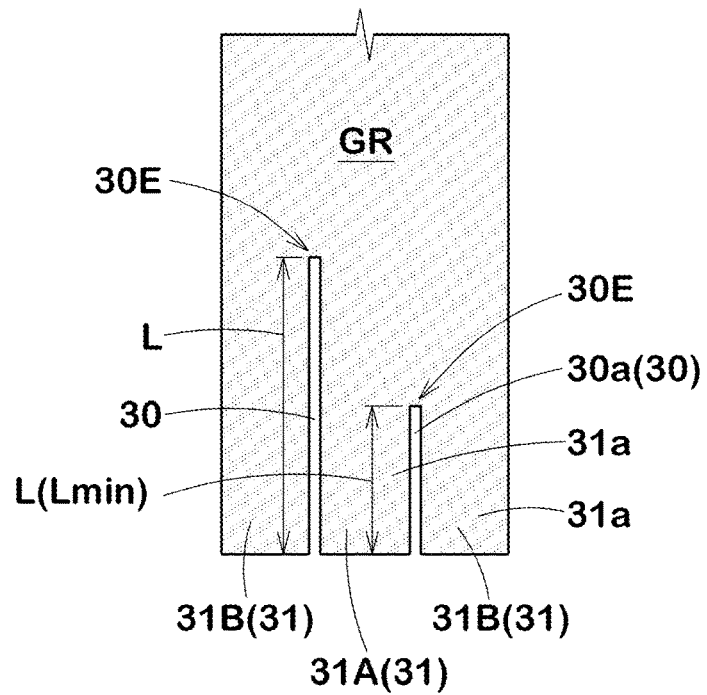
FIGS. 5A and 5B are conceptual views showing a processing step.
Figure 5B:
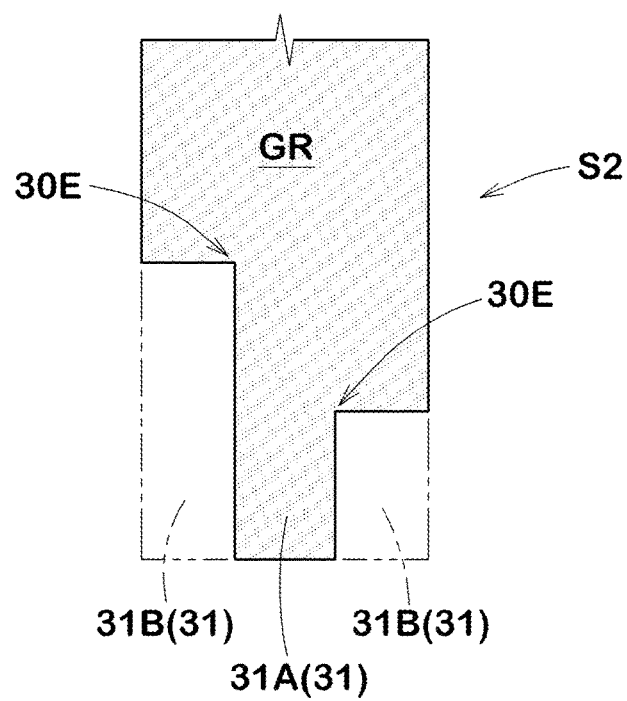

As illustrated in FIGS. 5A and 5B, in the processing step S2, of the n+1 strip-shaped portions 31, n second strip-shaped portions 31B other than a first the strip-shaped portions 31A are cut off, or folded up by the processing tool 6. The first strip-shaped portion 31A is defined as one of the two strip-shaped portions 31a and 31a adjacent to the minimum length cut 30a of the strip-shaped portions 31a. At least the width W of the first strip-shaped portion 31A is smaller than the opening width W3. Of the n+1 strip-shaped portions 31, the first strip-shaped portion 31A is preferably a strip-shaped portion 31 arranged on a middle side in the width direction.

In the present embodiment, the case where the processing tool 6 is the folding tool 7 is shown. Using this folding tool 7, the second strip-shaped portions 31B are folded so as to overlay a following portion GR, based on the positions of rear ends 30E of the cuts 30 adjacent to the second strip-shaped portions 31B.

Figure 9B:
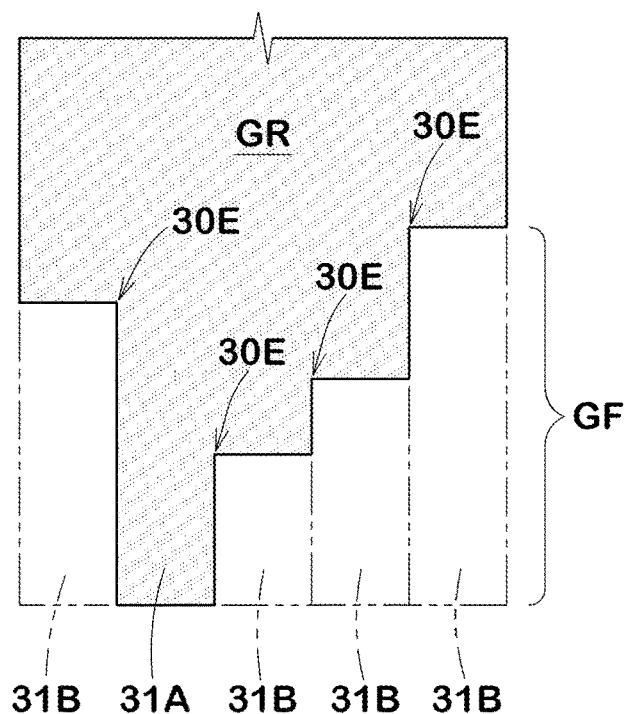

As illustrated in FIG. 9, when one or more second strip-shaped portions 31B each of which is formed between two cuts 30 (i.e., there are two cuts 30 adjacent to one second strip-shaped portion 31B), then such second strip-shaped portions 31 B are folded based on the position of the rear end 30E of the adjacent cut 30 having a smaller length L.

The following portion GR means a portion of the rubber material G that follows the strip-shaped portions 31.

As illustrated in FIG. 3, the rubber material supplying device 1 in this embodiment further comprises a guide tool 16 for guiding the second strip-shaped portions 31B to the following portion GR side. This guide tool 16 includes a roller 17. The guide tool 16 of the present embodiment includes a cylinder 18 attached to each elevating body 11 and the roller 17 is supported by a roller holder 19 at the lower end of a rod of the cylinder 18. The roller 17 is rotatably held around an axis parallel to the width direction Y.

As illustrated in FIG. 1, the guide tool 16 can press the second strip-shaped portions 31B being cut downward by the lowering of the roller 17. This prevents the second strip-shaped portions 31B being cut from being caught in the folding tool 7 located on the downstream side. In this embodiment, the roller 17 can move up and down by the cylinder 18 separately from the up and down movement of the cutters 8. However, the cylinder 18 may be directly supported by the lateral moving body 10 instead of the elevating body 11. In this case, roller 17 can be moved up and down separately from the cutters 8. Further, the roller holder 19 may be directly supported by the elevating body 11 without providing the cylinder 18. This allows the roller 17 to move up and down integrally with the cutters 8.

Figure 8A:
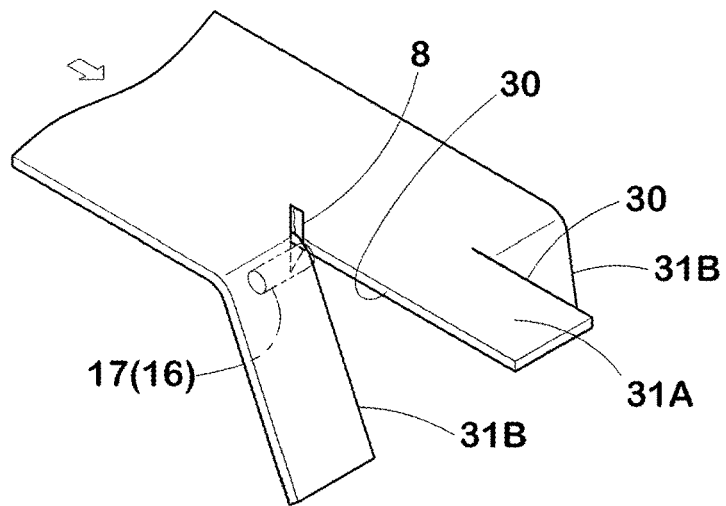
FIGS. 8A to 8C are perspective views showing functions of a folding tool viewed from a rubber material side.
Figure 8B:
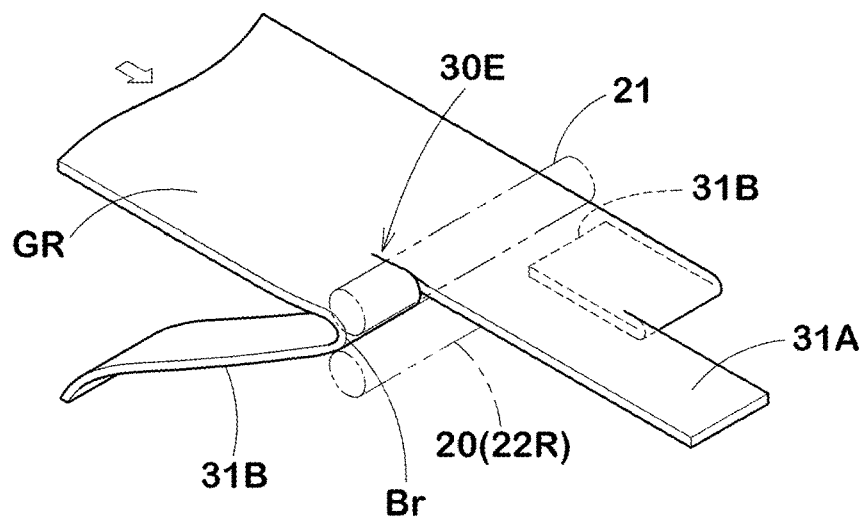
Figure 8C:
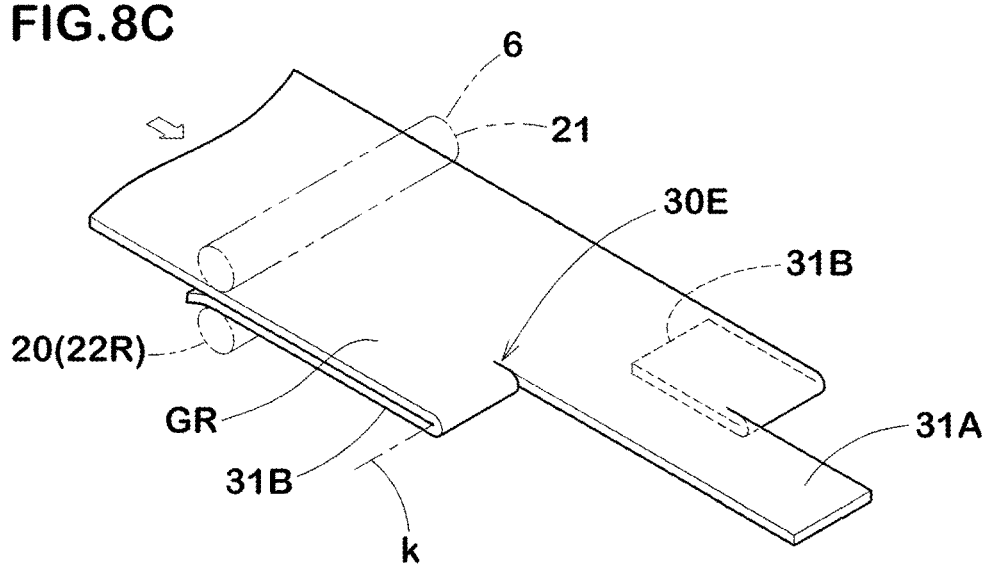

As illustrated in FIGS. 8B and 8C, the folding tool 7 can fold the second strip-shaped portions 31B so that they overlay on the following portion GR. In particular, the folding tool 7 preferably folds the second strip-shaped portions 31B posteriorly around the axis k along the width direction Y and crimps it to the following portion GR.

As illustrated in FIGS. 1 and 2, the folding tool 7, in the present embodiment, includes a conveyor portion 20 located downstream of the carrier 4, and a crimping roller 21 located above the conveyor portion 20. Then, between the conveyor portion 20 and the crimping roller 21, the second strip-shaped portions 31B are folded up and crimped to the following portion GR.

As the conveyor portion 20, a belt conveyor in which a conveyor belt 23 is wound between front and rear rollers 22F and 22R is preferably employed. A conveyor surface 20S of the conveyor portion 20 is driven by, for example, a motor M2 at approximately the same speed as the carrier 4. The crimping roller 21 is arranged at an upper position facing the rear roller 22R. In this embodiment, the crimping roller 21 is a weight roller, and thus can presses the conveyor surface 20S by its own weight or by using an energizing device such as a spring and the like.

Figure 7A:
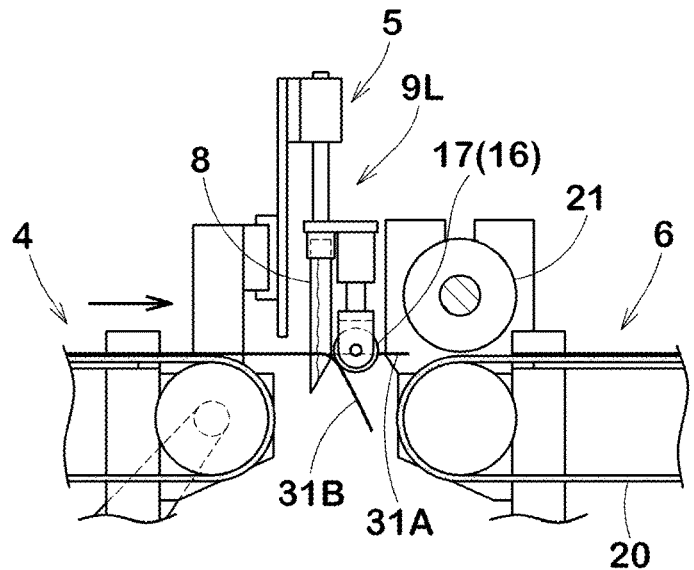
FIGS. 7A to 7C are side views showing functions of a folding tool.

FIGS. 7A and 8A show the state at the start of formation of the cuts 30 by the cutting tool 5. At the start of the formation, the folding tool 7 bites the first strip-shaped portions 31A sent from the carrier 4 side between the conveyor portion 20 and the crimping roller 21. At this time, the second strip-shaped portions 31B are guided downward by the roller 17 of the guide tool 16. Thus, the second strip-shaped portions 31B are not bitten by the folding tool 7.

Figure 7B:
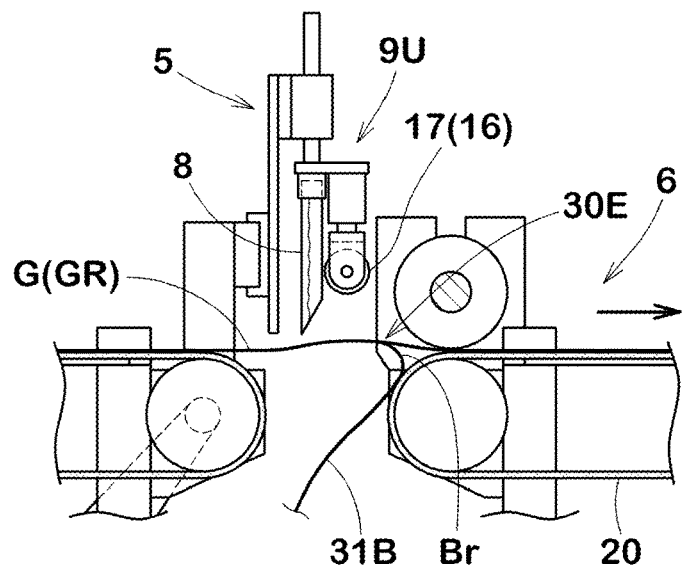

FIGS. 7B and 8B show the state at the end of the formation of the cuts 30. The cutters 8 and rollers 17 rise and move away from the rubber material G to complete the formation of the cuts 30. As the rear ends 30E of the respective cuts 30 approach the folding tool 7, the vicinity of the rear ends of the respective second strip-shaped portions 31B contact the conveyor portion 20 and begins to fold in a U shape.

Figure 7C:
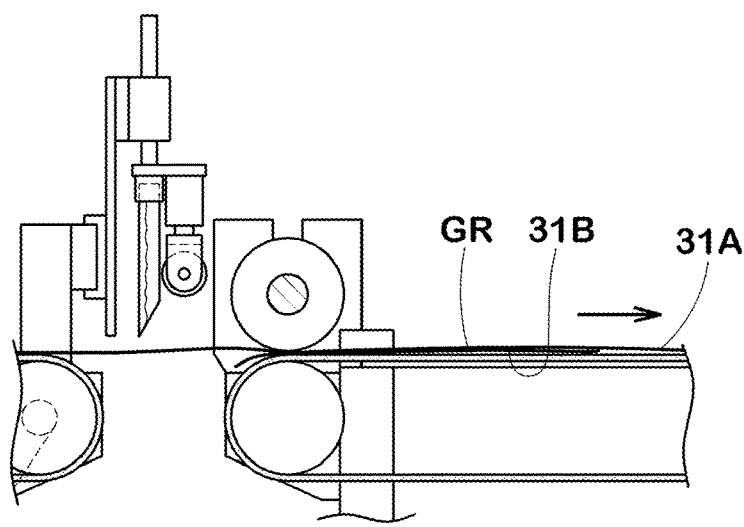

FIGS. 7C and 8C shows a crimped state of the second strip-shaped portions. The U-shaped bend portion Br of the second strip-shaped portions 31B are bitten between the conveyor portion 20 and the crimping roller 21. As a result, the second strip-shaped portions 31B are bent around the axis k, and then the second strip-shaped portions 31B are sequentially crimped to the following portion GR.

Thus, in the present embodiment, the conveyor portion 20 of the folding tool 7 also constitutes a part of the guide tool 16 for guiding the second strip-shaped portions 31B to the following portion GR side.

In this embodiment, a knife-shaped body was employed as the cutters 8 of the cutting tool 5. However, it is not limited to this, but can employ round blades, guillotine blades, and the like. For round blades and guillotine blades, it is preferable to use a plate that receives the lower surface of the rubber material G. In the case of a guillotine blade, it is preferable to cut the rubber material G when the conveying temporarily stopped.

In addition, as a part of the guide tool 16, a guide roller 25 (shown by a long and short dash line in FIG. 1) for bending hanging second strip-shaped portions 31B into a U shape can be separately provided. This guide roller 25 is located below the conveyor portion 20. Further, it is more preferable that the guide roller 25 is arranged so as to be able to move forward and backward on the rear side in the conveying direction.

In addition, two crimping rollers may be used as the folding tool 7, and the second strip-shaped portions 31B may be folded rearward and crimped to the following portion GR between them. At this time, it is preferable to provide at least one rib-shaped protrusion that extends continuously in the circumferential direction on the outer circumference of at least one crimping roller. This can increase the crimped strength.

In the processing step S2, the second strip-shaped portions 31B may be cut off based on the position of the rear ends 30E of the cuts 30. In this case, for example, using a guillotine-shaped cutting blade, the cutting blade is preferably lowered in synchronization with the rise of the cutters 8 after the formation of the cuts 30 is completed, and the second strip-shaped portions 31B are cut off. Various methods can be used for cutting and removing.

In addition, the conveyor portion 20 carries out the input step S3 in the rubber material supply method.

Figure 6A:
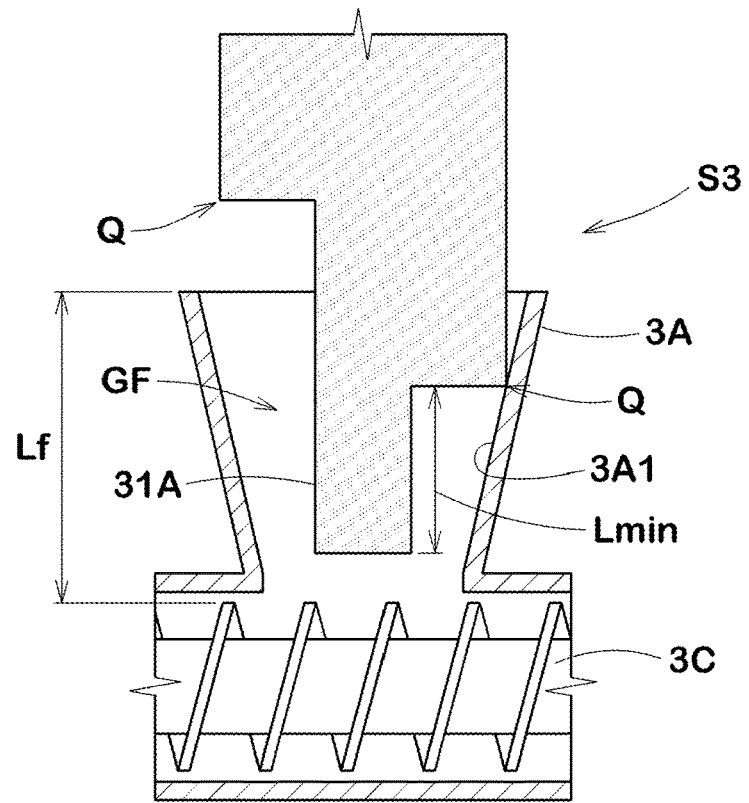
FIGS. 6A and 6B are conceptual views showing an inputting step.

As illustrated in FIG. 6A, in the input step S3, the leading end portion GF from which the second strip-shaped portions 31B have been cut off or folded is inputted from the first strip-shaped portion 31A into the rubber inlet 3A.

In this way, in the leading end portion GF from which the second strip-shaped portions 31B was cut off or folded, the width of the leading end portion GF gradually changed from the leading edge side, and the width W of the leading edge of first strip-shaped portions 31A is smaller than the opening width W3. Moreover, the lengths L of the cuts 30 is different from each other. Thus, edge portions Q located on both sides of the first strip-shaped portion 31A can be weakened from being caught on a shooter wall surface 3A1 of the rubber inlet 3A, and smooth supplying is possible.

Figure 6B:
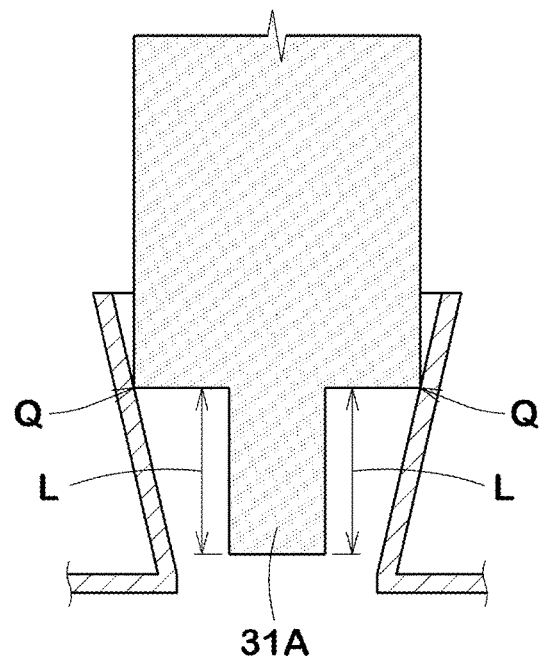

As shown in FIG. 6B, when the lengths L of the cuts 30 are the same as with each other, the edge portions Q are strongly caught by the shooter wall surface 3A1. Thus, it is difficult to input to the rubber inlet 3A smoothly.

As illustrated in FIG. 5A, the length Lmin of the minimum cuts 30a is preferably equal to or more than 1.0 times a distance Lf (shown in FIG. 6A) from an upper end of the rubber inlet 3A to an outer circumference of the screw shaft 3C. In this case, the first strip-shaped portion 31A can be bitten into the screw shaft 3C before the edge portions Q come into contact with the shooter wall surface 3A1, and the input failure can be surely suppressed. For convenience, FIG. 6A shows the case where the length Lmin<Lf.

In the cuts 30 and 30 on both sides adjacent to the first strip-shaped portion 31A, the length L of one of the cuts 30 is preferably equal to or more than 1.6 times the length L of the other one of the cuts 30. As a result, one edge portion Q contacts the shooter wall surface 3A1, and then the other edge portion Q contacts the shooter wall surface 3A1 with a sufficient delay. Thus, the catch on the shooter wall surface 3A1 can be further weakened.

Although the particularly preferable embodiments of the present invention have been described in detail above, the present invention is not limited to the embodiments shown in Figures, but can be modified into various embodiments.

REFERENCE SIGNS LIST 1 rubber material supplying device
3 rubber extruder
3A rubber inlet
3B barrel
3C screw shaft
4 carrier
5 cutting tool
6 processing tool
8 cutters
7 folding tool
20 conveyor portion
21 crimp roller
30 cut
30a cut with minimum length
30E rear end
31 strip-shaped portion
31A first strip-shaped portion
31B second strip-shaped portion
Fe leading edge
G rubber material
GF leading end portion
GR following portion
S1 separation step
S2 processing step
S3 input step

The invention claimed is:

1. A rubber material supply method for supplying a strip-shaped unvulcanized rubber material to a rubber inlet from a leading end portion in a length direction of the rubber material, the method comprising:
   a separation step of making a plurality of cuts extending rearwardly to closed rear ends in the length direction from a leading edge of the leading end portion of the rubber material to be conveyed in the length direction, the plurality of cuts being different in length L with each other to separate the leading end portion into three or more separated strip-shaped portions that include a first strip-shaped portion adjacent to one of the cuts having a minimum length and second strip-shaped portions other than the first strip-shaped portion;
   a processing step of cutting off or folding up the second strip-shaped portions such that a width of the leading end portion increases stepwise from a leading edge side; and
   an input step of inputting the leading end portion, in which the second strip-shaped portions have cut off or folded up, into the rubber inlet from the first strip-shaped portion;
   wherein a width of the first strip-shaped portion is smaller than an opening width of the rubber inlet.

2. The rubber material supply method according to claim 1, wherein
   in the processing step, the second strip-shaped portions are folded up so as to overlay on a following portion of the rubber material based on positions of rear ends of cuts adjacent to the second strip-shaped portions.

3. The rubber material supply method according to claim 1, wherein
   in the processing step, the second strip-shaped portions are cut off based on positions of rear ends of cuts adjacent to the second strip-shaped portions.

4. The rubber material supply method according to claim 1, wherein
   the rubber inlet is a rubber inlet of a rubber extruder that comprises a barrel and a screw shaft being held rotatably in the barrel, and
   the minimum length Lmin of the cuts is 1.0 times or more a distance Lf from an upper end of the rubber inlet to an outer circumference of the screw shaft.

5. The rubber material supply method according to claim 1, wherein
in a pair of cuts that is adjacent to the first strip-shaped portion, one of the cuts has a length equal to or more than 1.6 times a length of the other one of the cuts.

6. A rubber material supply device for carrying out the rubber material supplying method according to claim 1, the device comprising:
a carrier that conveys the rubber material from the leading end to a downstream side;
a cutting tool that makes the plurality of cuts extending rearwardly in the length direction from the leading edge of the leading end portion of the rubber material in the length direction, the plurality of cuts being different in length L with each other to separate the leading end portion into three or more separated strip-shaped portions that include the first strip-shaped portion adjacent to one of the cuts having the minimum length and the second strip-shaped portions other than the first strip-shaped portion; and
a processing tool to cut off or fold up the second strip-shaped portions, wherein
the width of the first strip-shaped portion is smaller than the opening width of the rubber inlet, and
the device is configured to input the leading end portion, in which the second strip-shaped portions have cut off or folded up, into the rubber inlet from the first strip-shaped portion.

7. The rubber material supply device according to claim 6, wherein
the cutting tool comprises a plurality of cutters for making the plurality of cuts.

8. The rubber material supply device according to claim 6, wherein
the processing tool is a folding tool that folds the second strip-shaped portion so as to overlay on a following portion of the rubber material based on positions of rear ends of cuts adjacent to the second strip-shaped portions.

9. The rubber material supply device according to claim 8, wherein
the folding tool crimps the folded second strip-shaped portion onto the following portion.

10. The rubber material supply device according to claim 9, wherein
the folding tool comprises
a conveyor portion arranged on the downstream side of the carrier, and
a crimping roller arranged above the conveyor portion to fold the second strip-shaped portion with the conveyor portion and to crimp it onto the following portion.

11. The rubber material supply method according to claim 1, wherein
a width of the rubber material is larger than an opening width of the rubber inlet.

* * * * *